3,180,783
FIRE RESISTANT ASPHALT COATING COMPOSITION AND SHINGLE

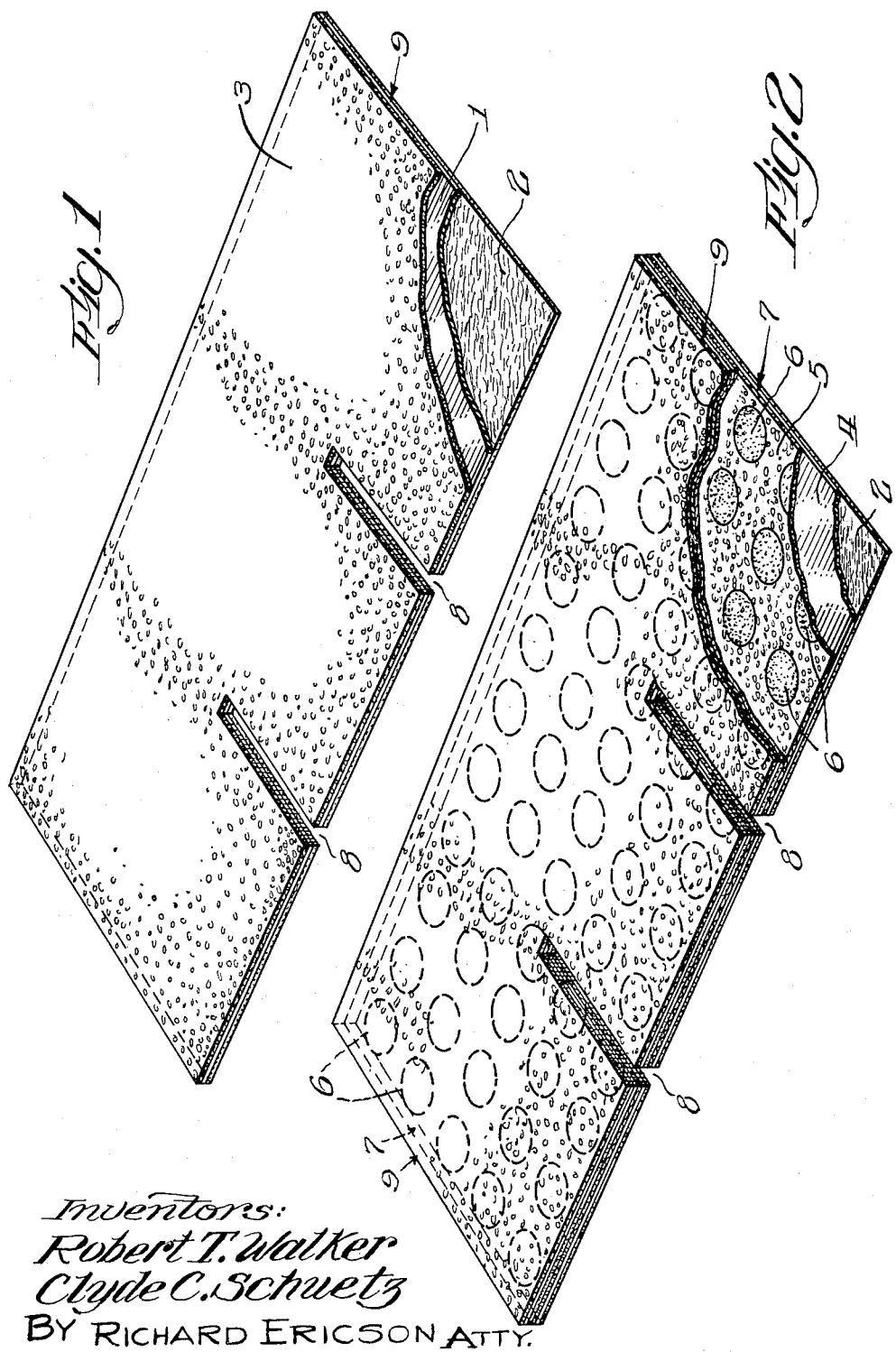

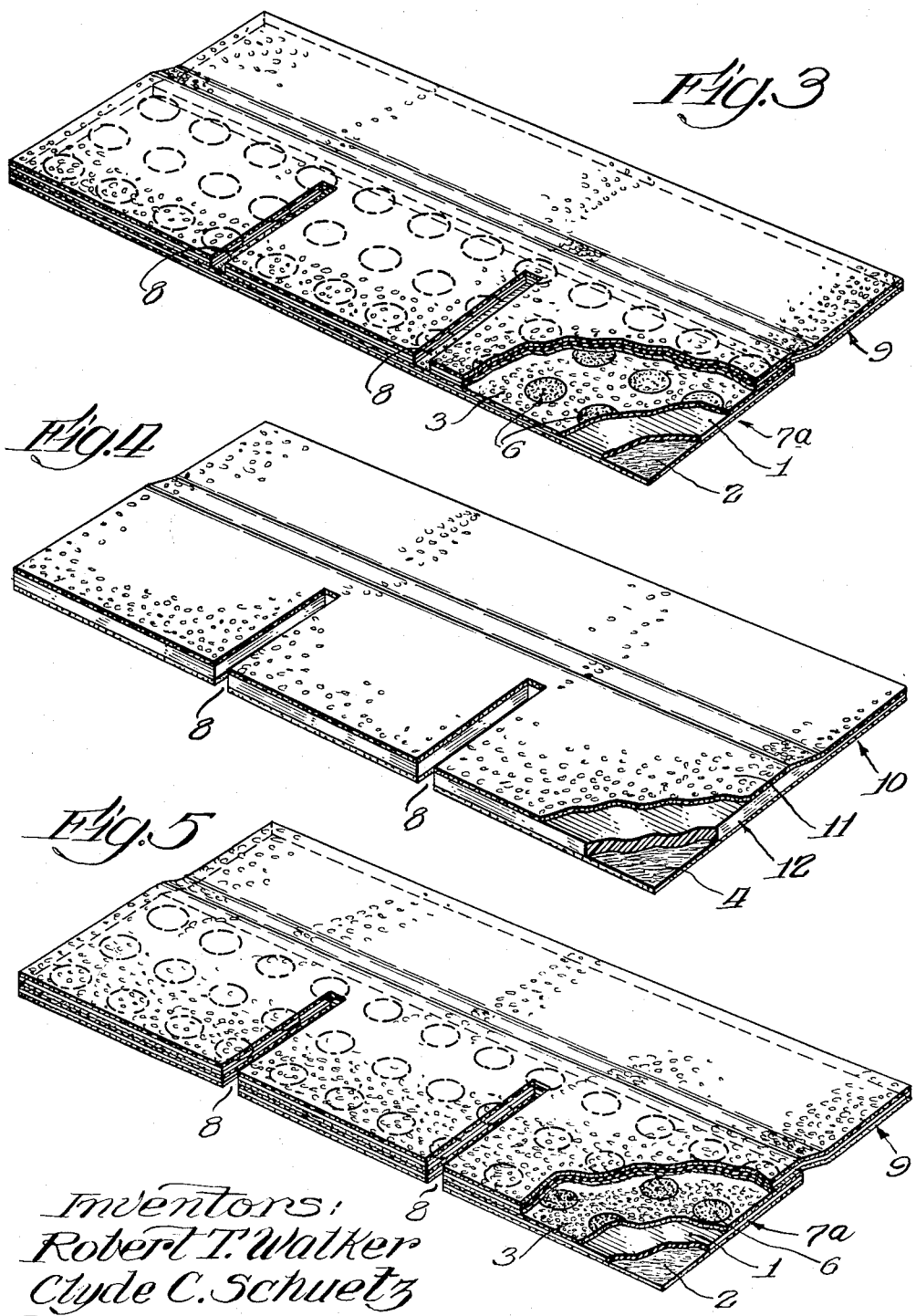

Robert T. Walker, Mount Prospect, and Clyde C. Schuetz, Prospect Heights, Ill., assignors to United States Gypsum Company, Chicago, Ill., a corporation of Illinois
Filed May 23, 1962, Ser. No. 197,001
6 Claims. (Cl. 161—93)

This invention relates to a fire resistant asphalt coating composition and to a shingle formed therefrom and more particularly to a novel fibrous coating which can be used to produce an extra thick shingle upon a conventional roofing machine.

The customary asphalt roofing is made by applying a coating composition containing a mineral filler, such as slate dust, ground limestone, etc., and an asphalt over an asphalt saturated felt formed from cellulosic fibers. Mineral granules of various colors are usually embedded into the surface of the coating. An asphalt roofing made in this manner has poor resistance to fire and when fire tested as a thick butt strip shingle upon a pitched roof only an Underwriters' Laboratories class C rating can be obtained. Under the high temperature of a fire the coating quickly melts, ignites and flows downwardly thus not only spreading the fire but also exposing the felt which is quickly consumed thus permitting the fire to reach the substrate, usually of wood, within a short time. In the past, this tendency to flow under heat has been stopped by incorporating abestos fiber, mineral wool fibers, or glass fibers into the coating composition. While such coatings are effective in retarding the flow, they lack mobility and hence are difficult to spread at application temperatures so that a special roofing machine is required, the conventional high speed asphalt roofing machine being unsuited for the purpose. Also the ordinary commercial machines cannot make an extra thick shingle, found to be best suited for a roofing of high fire rating, as such cannot pass through the cooling loopers. A special machine to make such a product would require a large capital investment.

If some type of fire retardant coating could be developed which can be spread easily, and thus is suitable for use upon the present high speed machine, yet does not flow excessively when subjected to a fire, a somewhat paradoxical condition, and if some means could be provided by which an improved extra thick shingle containing the coating can be prepared using the regular cooling loopers of the conventional asphalt roofing machine, a marked advance in the art would ensue.

It is therefore an object of this invention to provide an asphalt fire retarding coating which can be readily mixed and spread upon a conventional asphalt roofing machine.

It is an additional object of this invention to provide an asphalt coating for shingles which will readily flow and spread upon a felt base during the manufacture of a roofing therefrom but will be retardant to flow when the roofing is subjected to fire.

It is a further object of this invention to provide fire resistant thick butt or uniform thick shingles which can be made upon a conventional roofing machine without a change in the cooling loopers.

It is a still further object of this invention to provide a roofing of the laminated thick butt type strip shingle with a class A fire rating and capable of being manufactured upon a conventional roofing machine.

It is also an object of this invention to provide a laminated thick butt strip shingle of markedly improved resistance to fire.

It is another object of this invention to provide an asphalt roof of exceptional high wind resistance.

Various other objects will readily occur to those skilled in the art to which this invention appertains.

This invention is best understood by means of drawings in which:

FIGURE 1 is a perspective view of a conventional strip shingle containing a coating following this invention, FIGURE 2 is a perspective view of one form of a laminated shingle containing a fire retardant coating and a full cutout in each lamina.

FIGURE 3 is a perspective view of another form of a thick butt type laminated shingle showing cutouts in the upper lamina only and which is the preferred embodiment, FIGURE 4 is a perspective view of a thick butt shingle containing a single thick layer of a coating forming the subject of this invention, and FIGURE 5 is a perspective view of still another form of a laminated shingle similar to FIGURE 3 but with the cutouts in both laminae.

The objects of this invention are accomplished by the use of a unique blend of certain selected fillers with an asphalt, preferably of the coating grade. In addition, the purpose of this invention is further achieved by the lamination of two or more layers of an asphalt roofing, containing the coating, in a novel manner to form an improved shingle. The coating is unique for while it flows is sufficiently retarded when subjected to a fire that it will not readily run off, yet there is enough mobility when heated to application temperatures that it can be applied and spread as a coating in the usual way upon a conventional roofing machine. In addition, it forms a protective crust by the action of the heat from a fire.

The special filler used in making this coating consists of a novel combination of short glass fibers and ground unexpanded vermiculite along with the ordinary conventional fillers, such as ground limestone. A typical range of such ingredients for making the coating is as follows:

Coating asphalt, 200–235° F., SP _____ 40–60% by weight.
Short glass fibers, 10 to 30 micron diameter, ¼" to 1" in length _____ 0.25–5.0%.
Unexpanded vermiculite —10 to +100 mesh, predominately —16 +40 size _____ 10–30%.
Conventional fillers such as ground limestone or slate ___ Balance to make 100%.

In the above formula, the lesser percentage of fibers is used with the lower micron diameter which also can be of shorter length; still lower diameter, such as of 4 microns, glass fibers can be used as it is not the intention to limit the size of glass fibers to the particular range set forth. With the lower micron diameter even less than .25%, i.e., 15%, can be used.

While it is preferred to apply the coating already premixed to the roofing felt, it is also possible to add the short glass fibers separately to the surface such as by sifting or spraying, either before or after the spreading of the remaining coating. This modification is not preferred, for although it will facilitate the spreading of the coating, the fibers are not as well distributed when compared with premixing.

The most effective grade of unexpanded vermiculite is that having a particle size range which when expanded will be best suited as an aggregate for use with calcined gypsum as a wall plaster. Such a grade of unexpanded vermiculite usually has a particle size range of between about —10 and +100 mesh sieve with most between —16 +40 mesh. While the aforesaid particle size range is preferred and is used as a basis for preparing the coatings in all of the examples, it is not the intention to limit the scope of this invention to the particular particle size distribution set forth for any size may be used as long as it will impart the desired properties to the coating. Particle sizes as large as ¼" or as fine as plus 200 mesh may be included. A suitable source of vermiculite is that found in the vicinity of Libby, Montana.

A preferred embodiment of an asphalt coating and one which has been found very successful in carrying out this invention is set forth below:

| | Percent by weight |
|---|---|
| Coating asphalt, 225–230° F., SP (ring and ball) | 50.0 |
| ½" long cut glass roving with an average filament diameter of 13 microns | 0.35 |
| Unexpanded vermiculite, plaster grade | 15.0 |
| Ground limestone filler | 34.65 |

As previously mentioned, the above composition can be mixed and spread as a coating in the manner commonly followed in a conventional roofing plant, no substantial change in equipment being necessary. This coating is relatively easily mixed free of large clumps of glass fibers and to have high mobility when heated. It spreads readily upon the machine and hence will not cause any substantial decrease in the rate of production, a decided advantage.

The above formula is used to make the different laminae strip shingles required to make the various forms of laminated shingles which constitute the important embodiments of this invention. These sheets are made of such thickness that they will readily pass over the cooling loopers. The shingle used as the upper or top lamina usually has large size granules over its entire exposed surface though a smaller size can be applied beyond about 2" above the butt or exposed portion. The lower lamina, is formed in a similar manner though in this case, the granules are smaller in size and preferably darker in color so as to accentuate the cutout area when the cutouts are limited to only the upper lamina. These smaller size granules enable a thicker coating of the fire retarding material to be used, if desired, and still pass over the cooling loopers, though the lower lamina usually has a lesser coating. If a shingle with less fire resistance is satisfactory, then the coating upon the lower shingle can be of the conventional type, i.e. without the glass fibers and/or unexpanded vermiculite. Also, as will be further described in detail, it is within the ambit of this invention to extend the lower lamina only a short distance, such as two inches, above the contemplated exposed portion using only the top lamina for the remaining of the head lap.

In the figures, FIGURE 1 illustrates a butt shingle which is one form of a covering for roofs made following this invention and which can either be applied alone to a roof or preferably, used as an upper lamina 9, such as shown in FIGURES 2, 3 and 5. In FIGURE 1, 1 is the fire retardant coating, 2 a regular asphalt saturated felt, 3 the granules, which should have a pleasing color at least in the exposed portion, and 8 the cutouts. The lower lamina shown in FIGURES 2, 3 and 5 as 7 and 7a, is made similar to the upper lamina and consists of an asphalt saturated felt 2, see FIGURE 2, upon which is applied the coating 4 which has, preferably, though not necessarily fire retardant properties similar to that used in the upper lamina. Granules 5, which can be smaller in size than those used in the upper lamina, are placed over and embedded into the coating. The two laminae are adhered together by means of 2" diameter asphalt adhesive spots 6 placed 3" on centers. These are preferably applied to the upper surface of the lower lamina during its manufacture by a suitable application roll and the two laminae either joined together manually or mechanically by means of suitable conveyors and squeeze rolls. Such an operation is well known to those skilled in the art in which this invention is a part and hence need not be described in detail.

The following is the approximate weight of the various parts of the laminae used to form a laminated shingle following this invention.

| | Lb. per 108 sq. ft. |
|---|---|
| Upper lamina: | |
| Saturated roofing felt | 31.2 |
| Asphalt coating, see preferred embodiment | 42.2 |
| No. 11 granules | 31.2 |
| Backing, such as talc or mica, to prevent sticking | 1.0 |
| Total | 105.6 |
| Lower lamina: | |
| Saturated roofing felt | 31.2 |
| Asphalt coating, see preferred embodiment | 35.4 |
| No. 18 granules | 20.0 |
| Backing, such as talc or mica, to prevent sticking | 1.0 |
| Total | 87.6 |
| Total for shingle | 193.2 |

Upper and lower laminae of 16" wide and 36" long strip shingles having weight distributions similar to the above were laminated together to form shingles as shown in FIGURE 3 in which the bottom lamina 7a extends only 9" above the lower edge with a 7" cutout in the top lamina only. When shingles made in this manner were laid with a 7" exposure, they successfully passed a full scale class A Underwriters' Laboratories test which included the fire brand, flame exposure and flame spread tests. A good crust was formed on the surface of the shingle during the test with very little run off.

It is also within the scope of this invention to extend the lower lamina the full width of the shingle with coinciding cutouts 8 in each lamina as shown in FIGURE 2. It is preferred, however, for the cutouts to be formed only in the top lamina as depicted in FIGURE 3.

In preparing the preferred embodiment shown in FIGURE 3, each lamina is made as a separate shingle, like FIGURE 1, by applying and spreading a layer of the fire retardant asphalt coating, such as described above, upon an asphalt saturated felt. The thickness should not be substantially greater than that normally used. Granules are applied thereover and partially embedded therein. While it is preferred to use the same size granules over the entire surface, the portion of the shingle which is to be the head lap of the upper lamina may be of smaller and cheaper granules, a procedure commonly practiced in this art.

Inasmuch as these shingles are prepared in the conventional manner, this special coating must have the unexpected property of ease in spreading over the felt so that the machine need not be slowed appreciably. Such is the case, and also the entire sheet will be found to readily pass through the cooling loopers since the thickness has not been substantially increased. When the shingle is formed which is to be the lower lamina, the granules are smaller and darker, a lesser amount of the coating is applied and there are no cutouts. The shingles are laminated together in any suitable manner well known in such art.

While it is preferred and an important part of this invention to form strip shingles having a fire retardant coating of a thickness which can readily pass over the cooling loopers of an ordinary roofing machine and then laminate portions thereof to form the thicker shingle needed to obtain a high fire resistance, it is also possible and within the scope of this invention to apply the novel coating, forming a part of this invention, as an extra thick layer upon at least the butt portion during its manufacture and to not laminate. However, while the coating could be readily spread, it would be difficult to form such a shingle upon a regular roofing machine without substantial alterations. FIGURE 4 shows such a shingle in which 2 is the usual asphalt saturated felt and 12 an extra thick layer of the coating similar to the preferred embodiment set forth above. This layer can be of uniform thickness throughout or preferable, as shown, with the head portion 10 thinner. Covering granules 11 are applied thereover. In this shingle the cutouts 8 extend through the entire shingle which is a disadvantage over the laminated shingle where it is possible for the cutouts to be formed only in the upper lamina with consequent added fire retardancy.

An added advantage of the laminated shingles is their marked resistance to butt raising or blowing off by a high wind. In a wind tunnel test made upon a section of a roof formed from a laminated shingle, such as described as the preferred embodiment, the butts were so resistant that the nails were pulled out of the deck when the shingle blew off under a breakdown velocity yet the shingles were still intact.

While a preferred embodiment of the coating forming an important part of this invention has been given in detail and its use in various types of shingles, principally laminated, set forth, it is obvious that various other modifications can be made in the composition and its use in various other types of shingles and roofing and still be within the scope of this invention. Such modification need not pass the class A test and still afford an improvement in the fire retardancy of a roof covered therewith. When properly prepared such modification in the coating will be found suitable for use upon a regular asphalt roofing machine. The coating coupled with the novel lamination of at least two layers to obtain the added thickness to give good fire retardancy has resulted in a substantial contribution to the asphalt roofing art.

By glass fibers is meant a ceramic fiber which is relatively uniform in diameter such as obtained by drawing a molten glasslike composition through an orifice followed by cooling. A wide range of fiber diameters, from 4 to 30 microns, is suitable though it is preferred to use those having smaller diameters. The fibers must be cut into short lengths so as to facilitate mixing and spreading.

The above preferred embodiments of this invention are given for the purpose of enabling those skilled in the art to practice the invention and are not intended to be a limitation thereof which scope and extent is defined by the forthcoming claims.

We claim:

1. A fire retardant asphalt roofing comprising a flexible combustible base sheet and a uniformly distributed heat spreadable coating over said base sheet, said coating comprising coating asphalt, 200–235° F. softening point, between about 40 to about 60%; glass fibers, 4 to 30 microns in diameter, about ¼" to about 1" in length, about .15 to about 5%; unexpanded vermiculite, minus about a 10 mesh sieve and plus about a 100 mesh sieve, about 10 to about 30% and the balance conventional fillers, all percentages are by weight, said asphalt roofing characterized by high resistance to flow under flame conditions.

2. The fire retardant asphalt roofing claimed in claim 1 with mineral granules embedded in the surface thereof.

3. A laminated fire retardant asphalt butt shingle comprising a head and an exposed butt portion and an upper and a lower lamina secured to each other, each of said lamina comprising a heat spreadable asphalt composition uniformly spread over the surface of a combustible flexible sheetlike material and surfaced with mineral granules, the asphalt composition in at least the upper lamina comprising a fire retardant coating of coating asphalt, 200–235° F. softening point, between about 40 to about 60%; glass fibers, 4 to 30 microns in diameter, about ¼" to about 1" in length, about .15 to about 5%; unexpanded vermiculite, minus about a 10 mesh sieve and plus about a 100 mesh sieve about 10 to about 30% and the balance conventional fillers, all percentages are by weight, said coating characterized by ease of spreadability when heated to a fluid condition in the roofing machine but flow resistant and incrustation formable under flame conditions.

4. The laminated fire retardant asphalt shingle claimed in claim 3 in which the lower lamina extends under the upper lamina at least under that of the intended exposed portion.

5. The laminated fire retardant asphalt shingle claimed in claim 3 in which the said upper lamina has cutouts extending into the butt portion thereof and said lower lamina also extending across the said cutouts.

6. The laminated fire retardant asphalt shingle claimed in claim 4 in which the said upper lamina has cutouts extending into the butt portion thereof and said lower lamina also extending across the said cutouts.

References Cited by the Examiner
UNITED STATES PATENTS

| | | | |
|---|---|---|---|
| 1,701,926 | 2/29 | Kirschbraun | 50—257 XR |
| 2,405,527 | 8/46 | Skolnik | 156—182 XR |
| 2,458,143 | 1/49 | Burns et al. | 117—140 XR |
| 2,718,479 | 9/55 | Bierly | 117—140 XR |
| 2,782,129 | 2/57 | Donegan | 117—168 XR |
| 2,893,889 | 7/59 | Schuetz et al. | 117—168 XR |

EARL M. BERGERT, *Primary Examiner.*

HAROLD ANSHER, *Examiner.*

UNITED STATES PATENT OFFICE
CERTIFICATE OF CORRECTION

Patent No. 3,180,783                                                   April 27, 1965

Robert T. Walker et al.

It is hereby certified that error appears in the above numbered patent requiring correction and that the said Letters Patent should read as corrected below.

Column 1, line 31, for "abestos" read -- asbestos --; column 2, line 32, for "filler" read -- fillers --; line 55, for "15%" read -- .15% --.

Signed and sealed this 21st day of September 1965.

(SEAL)
Attest:

ERNEST W. SWIDER                                    EDWARD J. BRENNER
Attesting Officer                                      Commissioner of Patents